(12) United States Patent
Lau et al.

(10) Patent No.: US 6,826,307 B1
(45) Date of Patent: Nov. 30, 2004

(54) CONTRAST DETERMINING APPARATUS AND METHODS

(75) Inventors: Simon Lau, Porthcawl (GB); Brinley Rhys Roberts, Porthcawl (GB)

(73) Assignee: Spectrum Technologies Plc, Bridgend (GB)

( * ) Notice: Subject to any disclaimer, the term of this patent is extended or adjusted under 35 U.S.C. 154(b) by 0 days.

(21) Appl. No.: 09/254,262

(22) PCT Filed: Sep. 4, 1997

(86) PCT No.: PCT/GB97/02370

§ 371 (c)(1),
(2), (4) Date: Mar. 24, 1999

(87) PCT Pub. No.: WO98/10365

PCT Pub. Date: Mar. 12, 1998

(30) Foreign Application Priority Data

Sep. 4, 1998 (GB) .............................. 9618471

(51) Int. Cl.$^7$ ................................................ G06K 9/48
(52) U.S. Cl. ................... 382/199; 382/112; 235/462.41
(58) Field of Search ................................ 382/195, 270, 382/273, 272, 186, 187, 274, 112, 199; 235/462.11, 462.41

(56) References Cited

U.S. PATENT DOCUMENTS

| 4,097,847 | A | * | 6/1978 | Forsen et al. ................ 382/272 |
| 4,238,768 | A | * | 12/1980 | Mitsuya et al. ............. 358/135 |
| 4,850,029 | A | * | 7/1989 | Moyer et al. ................ 382/272 |
| 4,916,298 | A | | 4/1990 | Raphaël |
| 4,941,192 | A | * | 7/1990 | Mishima et al. ............. 382/195 |
| 4,998,209 | A | * | 3/1991 | Vuichard et al. ............ 382/274 |
| 5,091,963 | A | | 2/1992 | Litt et al. ........................ 382/8 |
| 5,268,580 | A | | 12/1993 | He |
| 5,502,776 | A | * | 3/1996 | Manabe ........................ 382/172 |
| 5,504,319 | A | * | 4/1996 | Li et al. .................. 235/462.08 |
| 5,617,484 | A | * | 4/1997 | Wada et al. ................. 382/172 |

FOREIGN PATENT DOCUMENTS

| EP | 0 356 225 | 2/1990 |
| EP | 0 535 610 | 4/1993 |

* cited by examiner

Primary Examiner—Amelia Au
Assistant Examiner—Colin LaRose
(74) Attorney, Agent, or Firm—Young & Thompson

(57) ABSTRACT

The contrast determination apparatus includes illuminating light sources (12) and an image sensor (26) i.e. a 2-D CCD for capturing a two-dimensional image of e.g. a marked wire (32) on a holder (34), the captured image being sampled over the mark and the background. The sensor includes an optical system (28,30) selected with regard to the character size of the marks so that the field of view of the sensor is sufficient to contain a complete character as well as a generous amount of background. An area of the captured image is designated in which the samples for contrast measurement are to be taken, and a processor (24) takes the pixel values from the image which are thresholded to categorise them as "black", or "white", thus forming a two-tone image. Aggregates or averages of the "black" and "white" pixel values are used to derive the contrast measurement according to the formula: $(I_{max}-I_{min})/I_{max}$ where $I_{max}$ is the average value of the "white" pixels and $I_{min}$ the average value of the "black" pixels.

6 Claims, 1 Drawing Sheet

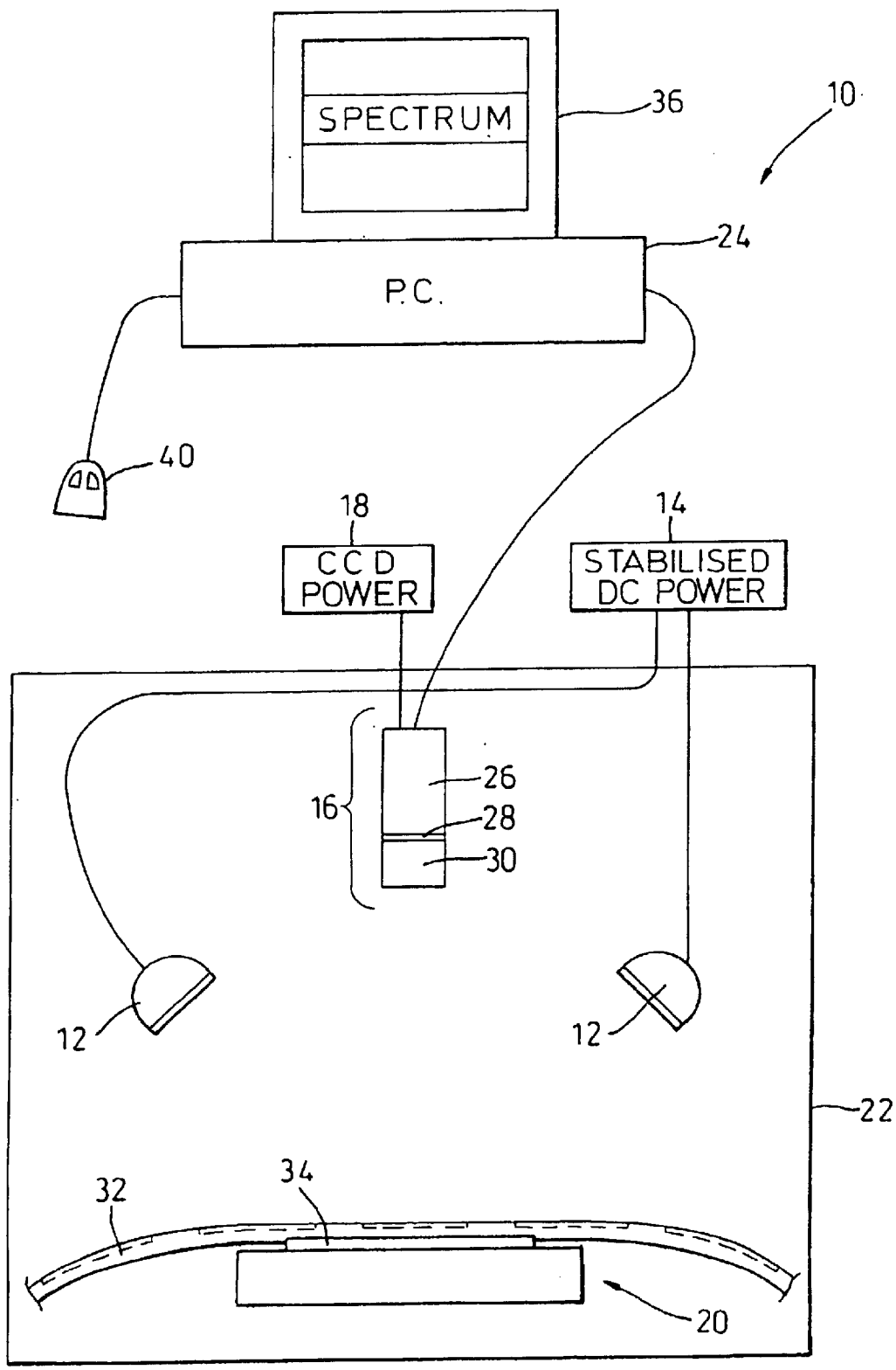

CONTRAST DETERMINING APPARATUS AND METHODS

FIELD OF THE INVENTION

This invention relates to contrast determining apparatus and methods and in particular, but not exclusively, to such apparatus and methods for measuring the contrast of marks on wires and cables. The invention however extends to contrast measurement in general and extends to diverse applications such as the measurement of the contrast in a bar code mark.

BACKGROUND OF THE INVENTION

The high legibility of user applied marks on wires and cables used in the aerospace industry is of critical importance and is an accepted requirement. However scientific, measurement of "legibility" has yet to be established. At present only one aspect of legibility, namely contrast measurement of marks, may be determined. In a conventional contrast measurement system for wires and cables, a photometer incorporating a photopic filter intended to match the human eye's response is used to measure the luminance at a point on the "black" mark or other indicia and at a point on the "white" background. These readings are taken one after the other and then used to calculate the contrast. The terms "black" and "white" are approximate terms because of course these areas will not show 0% and 100% reflectivity.

There are several drawbacks with the existing systems. Firstly the readings are taken one after the other which means that the lighting or other conditions may change, between readings. Furthermore, to take the two readings the wire or cable needs to be moved relative to the photometer and this may introduce extraneous factors which affect the measurement, for example the orientation or distance of the surface of the wire may change between readings. In addition, we have determined that the point sampling of the mark and background may not give a true indication of the contrast. For example the "whiteness" of the background or the "blackness" of the mark may vary at different points and so single samples may not be representative. Also, we have found that the legibility of a character perceived by the human eye/brain depends on the contrast of the whole character rather than just a single point.

U.S. Pat. No. 5,268,580 discloses a bar code enhancement system in which an image of an article carrying a bar code is captured. The image is analysed by dividing the image into groups consisting of 2×2 pixels. For each group three out of the four pixels are examined one at a time for contrast and the maximum and minimum values determined and used to obtain a value representing the contrast of that group. In this arrangement the contrast value is determined on the basis of a single "maximum" and a single minimum.

SUMMARY OF THE INVENTION

Accordingly, we have developed a new contrast measuring system which enables contrast measurement and which offers new features and capabilities not available in current photometers. In our system, a two dimensional image of at least part of the mark and the background is captured so that the image may be sampled at several points and preferably across substantially the whole of the selected part of the captured image.

Accordingly, in one aspect, this invention provides apparatus for determining the contrast of a mark, said apparatus comprising:

image sensor means for capturing a two-dimensional image of at least part of said mark and a background, means for sampling said captured image over a plurality of pixels in the mark and over a plurality of pixels in the background, to obtain respective intensity values for pixels in said mark and pixels in said background respectively, and contrast determining means for determining the contrast of said mark based on an aggregate or average of said intensity values for pixels in the mark, and an aggregate or average of said intensity values for pixels in the background.

The apparatus of the invention may be used to take just a few point samples from the mark and the background under the same background conditions simultaneously, as opposed to the earlier conventional arrangements which provided samples one after the other. It is however preferred to take a series of samples across the whole of the mark and the adjacent background and to use these sample points to provide a measure of contrast.

The image sensor preferably comprises a two dimensional CCD array sensor. The sensor is preferably provided with an optical system selected with regard to the character size of the marks so that the field of view of the sensor is sufficient to contain a complete character and a generous amount of background.

The apparatus preferably includes means for designating an area of the captured image in which the samples for contrast measurement are to be taken. In this way an operator may designate the required character and background, cutting out any extraneous part of the image which might give rise to error.

Where the image sensor is a CCD array or other sensor giving pixel values, the contrast determining means preferably takes the pixel values in the image (or the selected part thereof) and thresholds the pixel intensity values to categorise pixels having an intensity less than a first preset value as "black" and pixels having an intensity greater than a second preset value as "white". Pixels having intermediate pixel intensity values be categorised as an intermediate grey range, and are not used for contrast measurement. The contrast determining means preferably derives a value corresponding to the aggregate or average of the "black" pixel intensity values and likewise a value for the aggregate or average of the "white" pixel values and uses these aggregates or values to derive the contrast measurement. For example, the contrast measurement may be obtained from the formula:

$$(I_{max} - I_{min})/I_{max}$$

where $I_{max}$ is the average intensity value of the "white" pixels and $I_{min}$ the average intensity value of the "black" pixels.

It will however be appreciated that the sample values may be processed differently to derive a measurement of contrast. Equally, having captured the image, other image analysis techniques may be used to derive further measurements of legibility. For example, the sample values may be analysed to determine the sharpness or crispness of the boundary of the mark, and so on.

In another aspect, this invention provides a method for determining the contrast of a mark, said method including the steps of:

(i) capturing a two-dimensional image of at least part of said mark and a background, (ii) sampling said captured image over a plurality of pixels in the mark and over a plurality of pixels in the background, to obtain intensity values for pixels in said mark and in said background respectively, and (iii) determining the contrast of said mark based on an aggregate or average value of said intensity values of pixels in said mark, and an aggregate or average value of said intensity value of pixels in said background.

BRIEF DESCRIPTION OF THE DRAWING

The invention may be performed in various ways and, by way of example only, a specific embodiment thereof will now be described in detail, reference being made to the accompanying drawing, which is a schematic diagram of a contrast measurement system in accordance with this invention.

DETAILED DESCRIPTION OF THE PREFERRED EMBODIMENT OF THE INVENTION

The contrast measuring apparatus 10 comprises dual 45° light sources 12 powered by a dc stabilised power supply 14, a photometer 16 or a photopic detector closely matching the CIE standard calorimetric observer at 0°, a detector power supply 18 and a target stage 20 all housed within a forced air cooled housing 22. The photometer 16 is connected to a PC 24 with a frame grabber card and image analysis software. The photometer 16 is a black and white CCD video camera 26 typically with a ½ inch CCD sensor with 756 by 581 pixels, but it will be possible to use many other different sized sensors such as 788 by 493 pixels or a ⅓ inch CCD or other variations. The camera is fitted with a Y photopic transmissive filter 28 which closely matches the CIE standard calorimetric observer, and imaging optics 30.

The operator places a marked wire 32 in a wire holder 34 on the target stage 20 directly beneath the photometer, thus illuminating the sample by the dual light sources 12.

The operator positions the wire in the correct position for measurement by viewing the video picture on the PC monitor 36 captured by the photometer and relayed to the monitor 36 via the frame grabber card and the video display controller. When satisfied with the position of the wire, the operator presses a key and the PC stores a frame of the current video image. This frame contains full video information including 8 bit (256) grey scales for each of the pixels constituting the frame.

Once the frame is stored in memory, the operator can choose to store this information as a data file for analysis at a later date, or he may wish to analyse the mark and background immediately to generate a contrast result. In which case, the operator uses the mouse 40 or other means to draw a box around the particular mark and background to be measured. The custom software analyses the stored data to generate a contrast result of the mark with respect to the surrounding background.

The contrast measurement may be derived in different ways. In one example, the pixel intensity values may be thresholded to categorise them as "white, "black" or intermediate grey. The intermediate grey pixel values may be discarded and then average "black" and "white" intensity values ($I_{min}$, $I_{max}$) obtained. The $I_{min}$ and $I_{max}$ values may be used to obtain a value for contrast by the formula:

$$\text{Contrast} = \frac{I_{max}}{I_{max}} - I_{min}$$

The image may also be subjected to other image processing techniques to determine other characteristics indicative of legibility of the image.

Having produced the contrast result, the operator may also choose to store this result with an image of the wire under investigation, with perhaps, the selected region or regions which have been measured. Being PC based, the operator may also input other relevant data such as the date, the operator, the wire, etc for historical purposes. This stored data which may be accessed at a later date could be used in report generation perhaps for quality control issues to track the variability of measured contrast with time or by wire type, etc.

This measuring device provides some very useful benefits over the current art. The current art can only measure a single point or single points along a line. Measurement over an area is not possible with the alternative being repeat measurements with the wire repositioned to present a different sampling point. This is very time consuming and prone to positional accuracy unless some kind of accurate translation device is employed. However the new design can sample a whole area cove-ring almost half a million individual sensors in less than a second providing the user with a regular array of measured locations. A variety of magnifications can be employed using the optics 30 so that this array can correspond to a variety of dimensions at the, target surface, in this example, sampling is over an area of 3 mm×4 mm at the target. At this magnification, a single point from the array has a spot size of 4 microns.

With this new system, it is also possible to simulate a point measuring system or a line measuring system. This is achieved by following the operations given above for area measurement with the difference being that during analysis of the full image the operator uses the mouse or other means to draw a line or specify a point sectioning or including the mark and background.

The current art employs single point measurement sampling areas between 120 microns and 400 microns. This compares to 4 microns for this system. The larger target sizes mean that contrast measurements of characters with stroke widths smaller or equivalent to, the target area are susceptible to errors caused by receiving light from outside the target. To prevent these erroneous measurements, the manufacturer's instructions normally recommend the measurement of block marks or full rectangles, that is targets whose dimensions exceed the dimensions of the sampling area. With the new system, much smaller targets can be measured, including regular characters.

The current art employs a single point measurement site and so to measure the contrast the luminance of the mark must be first measured and then the measurement of the background, or vice versa. As this takes an amount of time to reposition the target wire, it is necessary to employ a constant power supply to ensure a constant illumination level so that the results are equivalent. However, with the new system, the whole area is sampled at approximately 50 HZ or approximately 60 HZ meaning that light level shifts are less significant. Because contrast is simply a relative measurement it should be possible to simplify the system by omitting the stabilised power supply.

Finally, being PC-based the new art is well equipped for statistical analysis of any readings taken whether it be statistical analysis of each individual pixel from an array or statistical analysis of a series of contrast measurements from separate marks to form a report.

What is claimed is:

1. Apparatus for determining the contrast of a mark, said apparatus comprising:

image sensor means (16) for capturing a two-dimensional image of at least part of said mark and a background, means (24) for sampling said captured image over a plurality of pixels in the mark and over a plurality of pixels in the background, to obtain respective intensity values for pixels in said mark and pixels in said background respectively, characterised by contrast determining means (24) for determining the contrast of said mark based on an aggregate or average of said intensity values for pixels in the mark, and an aggregate or average of said intensity values for pixels in the background, and outputting a contrast value result as a measurement of legibility, said contrast determining means (24) being operable to threshold the pixel intensity values from the image using associated black and white threshold values to categorize the pixels as "black" or "white" respectively, and to determine a contrast measurement obtained according to the following formula:

$$(I_{max} - I_{min})/I_{max}$$

where $I_{max}$ is the aggregate or average intensity value of the "white" pixels and $I_{min}$ is the aggregate or average intensity value of the "black" pixels.

2. Apparatus according to claim 1, including means (24) for storing a series of samples taken across the whole of the mark and the adjacent background.

3. Apparatus according to claim 1, wherein the image sensor comprises a two dimensional CCD array sensor (26).

4. Apparatus according to claim 3, wherein the sensor includes an optical system (30) selected with regard to the character size of the marks so that the field of view of the sensor (16) is sufficient to contain a complete character and a generous amount of background.

5. Apparatus according to claim 1, including means (24/40) for designating an area of the captured image in which the samples for contrast measurement are to be taken.

6. A method for determining the contrast of a mark, said method including the steps of:

(i) capturing a two-dimensional image of at least part of said mark and a background, and (ii) sampling said captured image over a plurality of pixels in the mark and over a plurality of pixels in the background, to obtain intensity values for pixels in said mark and in said background respectively, characterised by (iii) determining the contrast of said mark based on an aggregate or average value of said intensity values of pixels in said mark, and an aggregate or average value of said intensity value of pixels in said background, and outputting a contrast value result as a measurement of legibility, wherein pixels from said image are thresholded using associated black and white threshold values to categorize the pixels as "black" or "white" respectively, and respective aggregate or average values of the intensities of said "black" and "white" pixels are determined, and a contrast measurement obtained according to the following formula:

$$(I_{max} - I_{min})/I_{max}$$

where $I_{max}$ is the aggregate or average intensity value of the "white" pixels and $I_{min}$ is the aggregate or average intensity value of the "black" pixels.

* * * * *